United States Patent [19]

Hutchison et al.

[11] Patent Number: 5,336,458
[45] Date of Patent: Aug. 9, 1994

[54] PROCESS OF MANUFACTURING EMBOSSED SIGNAGE FOR HANDICAPPED INDIVIDUALS

[75] Inventors: Glenn E. Hutchison, Prairie Village; Tracy M. Allen, Kansas City, both of Kans.

[73] Assignee: Universal Engraving, Inc., Overland Park, Kans.

[21] Appl. No.: 895,560

[22] Filed: Jun. 8, 1992

[51] Int. Cl.$^5$ ............................................. B29C 43/20
[52] U.S. Cl. .................................. 264/220; 264/225; 264/245; 264/257
[58] Field of Search ............... 264/219, 220, 221, 224, 264/225, 226, 227, 132, 257, 259, 245, 246

[56] References Cited

U.S. PATENT DOCUMENTS

| | | | |
|---|---|---|---|
| 1,677,929 | 7/1928 | Pippert | 264/219 |
| 2,075,507 | 3/1937 | Crowell | 264/226 |
| 2,294,865 | 9/1942 | Frankenthal et al. | 264/226 |
| 2,571,397 | 10/1951 | Wells | 264/226 |
| 3,103,168 | 9/1963 | Braznell et al. | 264/227 |
| 3,536,290 | 10/1970 | Terry | 249/104 |
| 3,748,202 | 7/1973 | Iisaka et al. | 264/225 |
| 3,852,145 | 12/1974 | Kloweit | 264/219 |
| 4,925,611 | 5/1990 | Shockney et al. | 264/225 |

*Primary Examiner*—Jay H. Woo
*Assistant Examiner*—Duane S. Smith
*Attorney, Agent, or Firm*—Hovey, Williams, Timmonns & Collins

[57] ABSTRACT

A sign having a raised message-defining image which may be read by sighted individuals and a series of raised dots presenting a corresponding encoded message in Braille characters, wherein the visually observable message is flat and has relatively sharp outlines so that it can be readily seen, whereas the Braille characters are of dome shaped configuration that fully comply with Braille specifications. A visually impaired person may touch and decipher the Braille characters and also feel the relatively sharp outline of the message intended for visual observation in order verify the content of the dual medium message of the sign. The sign is prepared using a metal female mold which is engraved with the dual reverse messages, whereupon a curable epoxy resin in flowable condition containing a tinting agent is poured over an engraved matte face of the mold, a partially cured epoxy backing member of a different color than the tinting agent is placed over the mold in covering relationship to the flowable resin, a compressible pressure-compensating sheet is placed over the backing member, and the resulting sandwich of components is subjected to heat and pressure which effects final curing of the resin composition as well as the backing member.

15 Claims, 2 Drawing Sheets

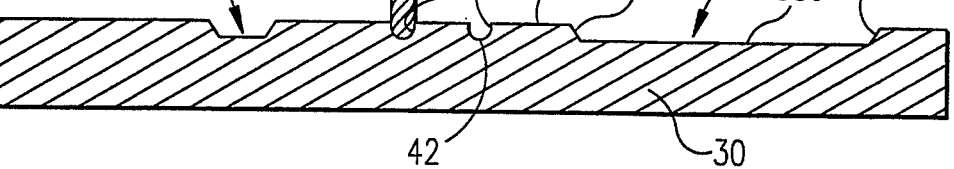
FIG. 5.
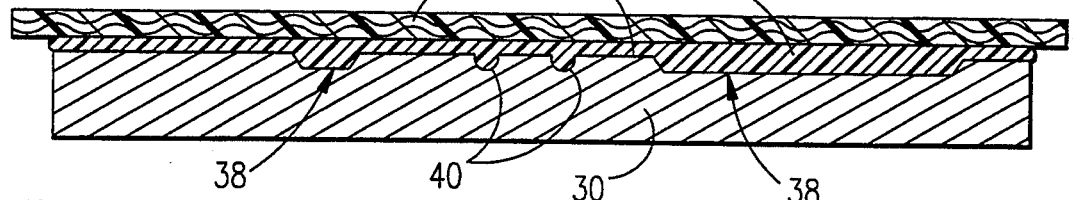
FIG. 6.
FIG. 7.
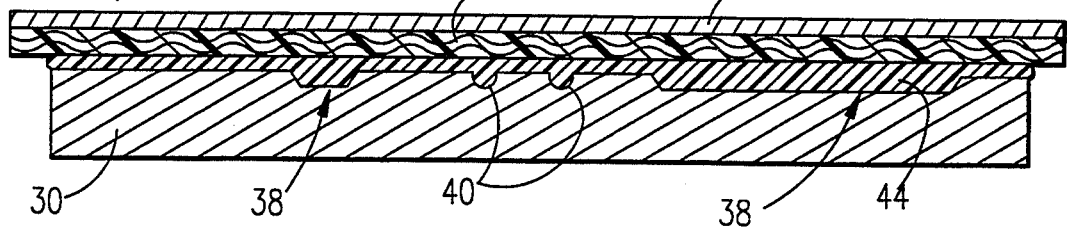
FIG. 8.
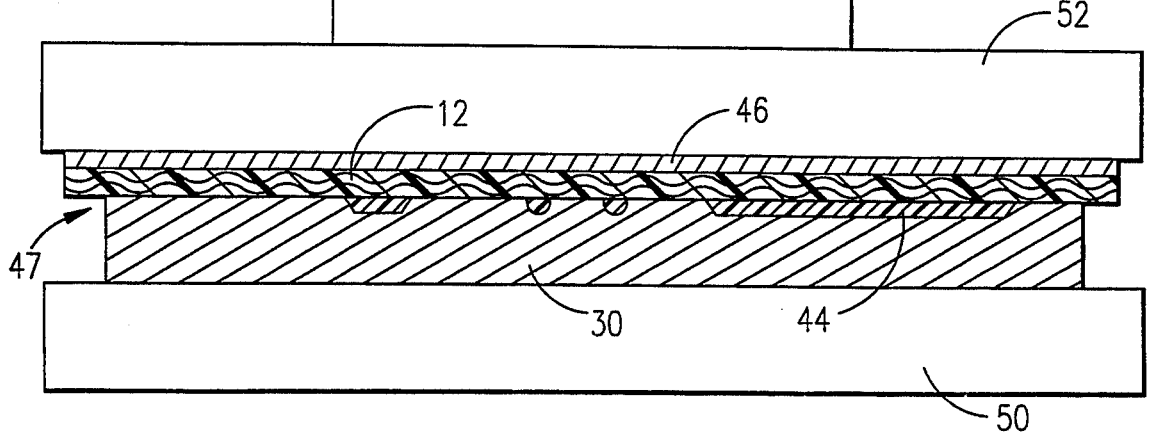
FIG. 9.

PROCESS OF MANUFACTURING EMBOSSED SIGNAGE FOR HANDICAPPED INDIVIDUALS

BACKGROUND OF THE INVENTION

1. Field of the Invention

This invention relates to signage which is directed to informing the public of the nature of accessible facilities. One example in this respect is public restrooms.

Signs designating publicly available areas such as restrooms or the like, have for some time included not only wording indicating the nature of the facility, but also the corresponding international symbol for that facility. Recent legislative enactments, and particularly the Americans with Disabilities Act (ADA), mandate that signs of this character include a corresponding message in Braille characters defined by raised dots. The Braille message must fully comply with the specifications for Braille characters as to the height of each dot, the spacing between dots, and especially must meet dome shape requirements. All public buildings that accommodate 25 or more persons must be appropriately marked with designating signs that meet the requirements of the Statute, commencing in the summer of 1992. Designating signs include those for elevators, corridors, restrooms and permanent areas.

One important aspect of the invention is to provide a method for producing signage having a raised message-defining image which can be read by sighted individuals as well as a series of raised dots presenting a corresponding encoded message in Braille characters that can be touch deciphered by visually impaired persons. The method allows economical production of the signs while still fully complying with the specifications for Braille characters and at the same time providing readily observable symbols and words that can be easily read by sighted individuals.

An important aspect of the invention is to provide a method of preparing signage that permits changing of the signs at required intervals or when the message depicted is changed, at a much lower cost than is the case when the signs are produced by conventional injection molding processes. Injection molds are very expensive and the equipment to mold items such as signs is also very costly.

2. Description of the Prior Art

Signs for public buildings and other publicly accessible facilities have for some time now included both words designating the nature of the room or building, as well as international symbols for the facility. An exemplary sign in this respect bears the words "Men" or "Women", along with the international symbol for a man or woman. In recent years, these signs have also included the international symbol for disabled persons (a stylized representation of a person in a wheelchair) to indicate that the facility has been especially adapted to accommodate disabled individuals.

The recently enacted federal legislation relating to disabled persons requires that signs of this type also include a corresponding message in Braille characters. However, the indicia in Braille must fully comply with long established specifications for Braille symbols. This includes not only the arrangement of the raised dots, but also the size of each dot, the spacing between dots, the height of the dots, and the overall configuration of each dot including the requisite dome shape.

In view of the large number of signs now in use which fail to meet the specifications of the ADA, there is a need to supply replacement signs which not only contain written designations as well as international symbols but also have Braille characters so that visually impaired persons can readily determine the nature of a facility. The large number of existing signs which must be replaced to comply with the requirements of the ADA, mandates that each sign be as economical as possible.

Many signs used to designate restroom facilities or other publicly accessible rooms or buildings, are simply flat panels, plates or printed paper panels. If of relatively recent vintage, most of these signs incorporate international symbols as well as printed words.

However, these prior signs do not readily lend themselves to refurbishment in order to include Braille characters. In the case of printed or silk screened signs, it simply is not possible to provide the raised Braille message-defining dots using silk screen or printing technology.

Engraved metal signs cannot be converted to define Braille characters, because of the need to provide raised dots which present the Braille letters and numbers. In like manner, signs made of synthetic resin materials, even when the signs are reinforced with glass fibers, cannot economically be updated to include raised dots, because of the impracticality of engrafting Braille-defining dots on the surface of the synthetic resin sign. The same problems are presented when there is a need to change the Braille characters because of revision of the sign.

In view of the compliance time constraints of the ADA, it is imperative that economical signs be made available at the earliest possible date so that the proprietor of buildings which are accessible to the public are not cited for violation of the Act and subjected to the penalty provisions of that legislation.

Use of resin-receiving injection molding molds to prepare signs is not usually a practical solution to the problem of producing designating signs because the molds are very expensive, it is time consuming to prepare the molds, the cost of the molds requires long runs of the same sign to justify the expense, and it is difficult to assure that the resin will flow into all cavities of the mold, and particularly the indentations defining the raised Braille dots, which as noted must be of dome shaped configuration.

SUMMARY OF THE INVENTION

It is therefore an important object of this invention to provide inexpensive signs that provide both written messages and international symbols that can be read by sighted individuals, as well as corresponding Braille characters which can be touch deciphered by visually impaired persons.

Provision of an inexpensive sign that presents a visually observable message as well as a corresponding raised dot message in Braille is accomplished by forming grooves in a metal master mold which define the visually observable message as well as indentations which present the corresponding Braille message in reverse. By virtue of the fact that the master mold is desirably of metal or similar hard material, the Braille-defining indentations may be milled out with a hand grinding tool or drill press so that the indentations are of the exact size, shape and spacing required to meet Braille symbol specifications. In like manner, the grooves formed in the mold plate to define the reverse visually observable messages, can likewise be engraved in the surface of the plate, or produced by chemical etching procedures followed if necessary by finishing of the cavity surface with a grinding or milling tool.

Upon completion of the metal female reverse mold, a quantity of a tinted, uncured synthetic resin such as epoxy is poured over the face of the mold to an extent that at least the message-defining grooves and Braille character indentations are filled with the epoxy resin. A contrasting pigmented glass fiber reinforced backing member of partially cured epoxy resin is placed over the mold and the layer of uncured epoxy resin. Next, a flexible sheet of compressible material defining a pressure-compensating element is laid over the backing member.

The combination of the mold, the tinted uncured synthetic resin composition, the partially cured backing member and the flexible pressure-compensating element are placed in a press for applying predetermined pressure and heat to the sandwich thus presented. During application of the heat and pressure, the epoxy resin of the tinted composition and of the backing member undergo curing whereby the thus solidified epoxy composition firmly bonds to the surface of the epoxy backing member. Because of the pressure being applied to the stack of different viscosity components, the tinted epoxy composition is expressed from between the mold and the backing member leaving only tinted composition in the grooves and indentations of the master mold. The compressible pressure-compensating sheet against the backing member assures uniform expression of the tinted epoxy composition from between the mold and the backing member so that there are no finger-like threads projecting outwardly from the message-defining grooves, or unfilled pockets in the grooves of the tinted composition which would detract from the surface appearance of the final sign. The use of the flexible backing member of compressible material assures that the grooves in the master mold are uniformly filled with the synthetic resin tinting material.

Upon removal of the mold, backing member and compressible sheet from the press, the compressible element may be readily peeled away from the rear surface of the backing member. In like manner, the mold may be readily separated from the front surface of the backing member because of the presence of a predetermined lubricant on the upper groove surfaces of the master mold.

As a result, the sign thus produced allows a visually impaired person to touch decipher the Braille characters, and also feel the outline of the raised message-defining image intended for visual observation in order for the individual without sight to verify the content of the dual medium message of the sign.

BRIEF DESCRIPTION OF THE DRAWINGS

FIG. 5 is an enlarged, fragmentary, cross-sectional schematic depiction of the step of preparing the female mold used in the practicing present method, wherein a grinding machine is used to shape the surface of the metal mold to form the Braille character defining indentations in the mold;

FIG. 6 is an enlarged, fragmentary, cross-sectional schematic depiction of the step of depositing a layer of a tinted, flowable synthetic resin composition over the upper surface of the master female mold;

FIG. 7 is an enlarged, fragmentary, cross-sectional schematic depiction of the step of placing a relatively rigid, partially cured, contrasting pigmented, synthetic resin backing member over the mold in covering relationship to the flowable layer of the synthetic resin composition;

FIG. 8 is an enlarged, fragmentary, cross-sectional schematic depiction of the step of laying a flexible, relatively compressible pressure-compensating element over the backing member; and FIG. 9 is an enlarged, fragmentary, cross-sectional schematic depiction of the step of applying sufficient pressure and providing adequate heat to the mold with the backing member and element thereon to cure the tinted synthetic resin composition and the backing member to produce the final sign product.

DESCRIPTION OF THE PREFERRED EMBODIMENT

Figure 1:
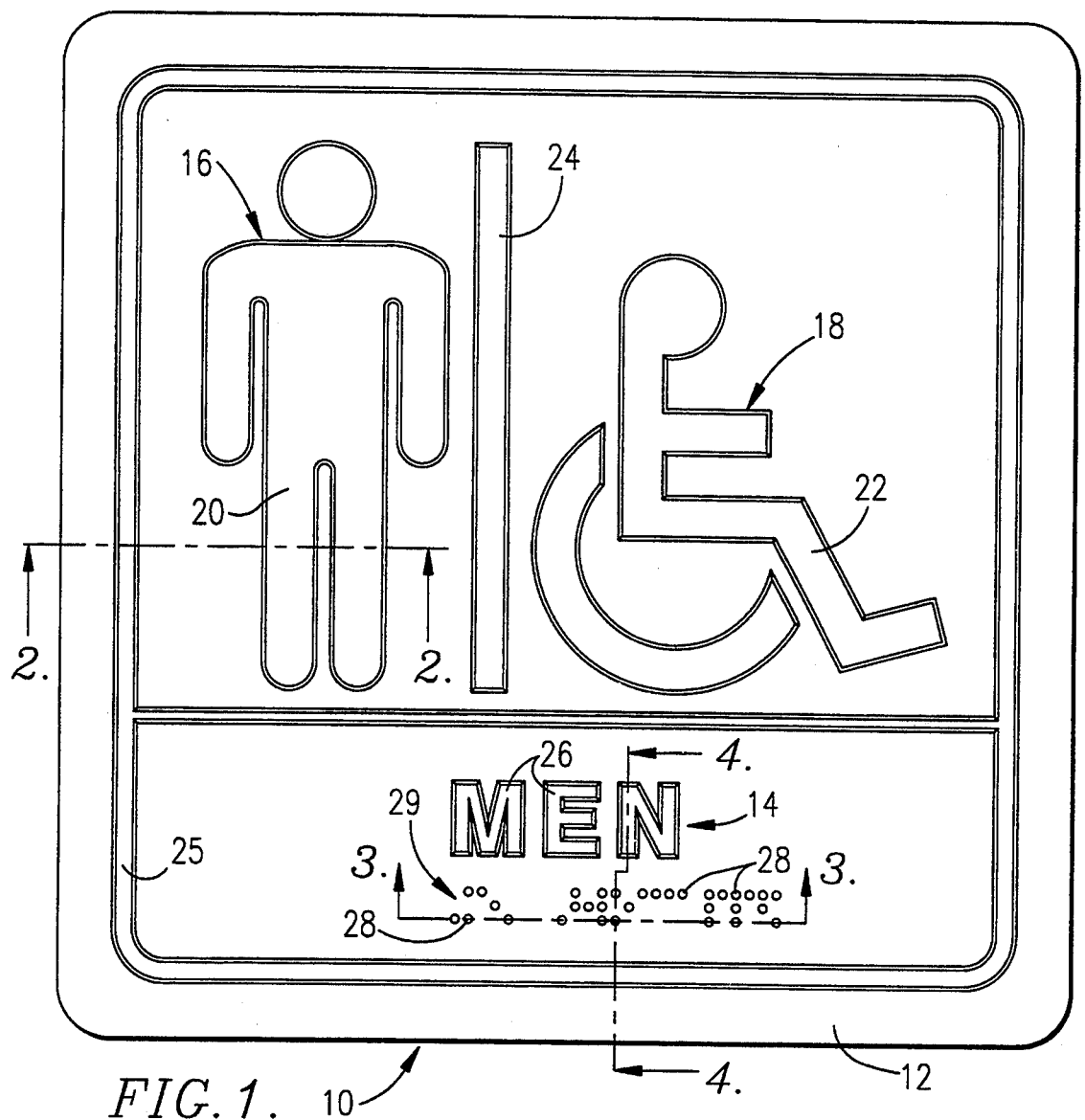
FIG. 1 is an elevational view of a sign embodying the preferred concepts of the present invention.

The sign broadly referred to by the numeral 10 in FIG. 1 is made up of a backing member 12 having indicia thereon presenting messages which can be visually observed by sighted individuals, or touch deciphered by visually impaired persons. In the exemplary sign depicted in FIG. 1, the messages conveyed by the sign 10 are defined by raised lettering broadly designated 14, a raised symbol 16 constituting the international pictograph corresponding to lettering 14, a raised pictograph 18 confirming that the facility on which the sign is mounted is capable of accommodating disabled individuals, and a series of Braille characters conveying to a visually impaired person information that is evident to a sighted individual viewing the sign 10. In certain circumstances, regulations require all three images be present on the sign, i.e., lettering, an associated pictograph, and Braille characters corresponding to the lettering and the pictograph.

Figure 2:
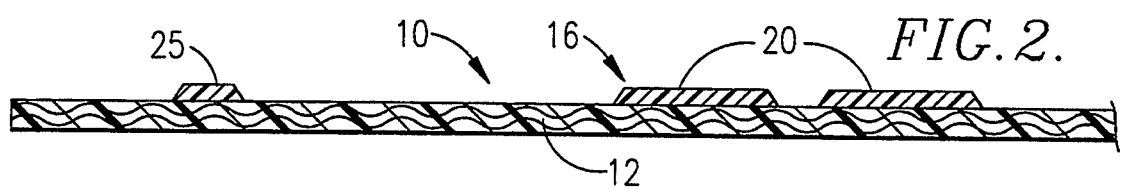
FIGS. 2, 3 and 4 are fragmentary, enlarged cross-sectional views taken on the lines 2—2, 3—3 and 4—4 respectively of FIG. 1 and looking in the direction of corresponding arrows.
Figure 3:
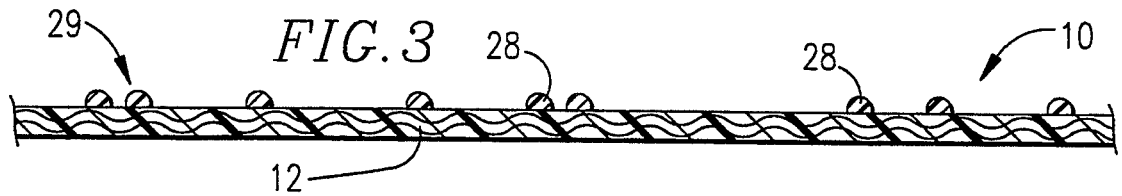
Figure 4:
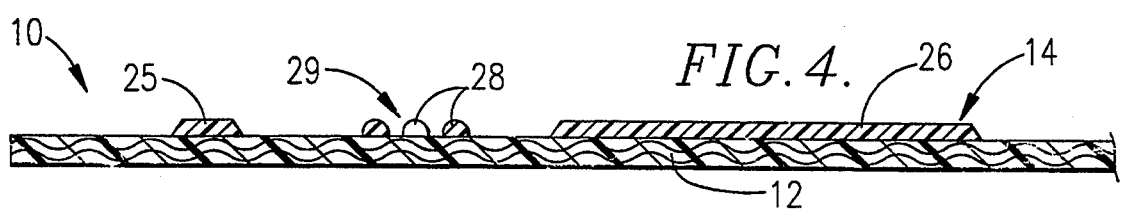

As is evident from FIG. 2, the international symbol designated by the numeral 16 constitutes a schematic representation of a man comprising a raised area 20 which for example may be of white pigmentation that contrasts with a blue background presented by backing member 12. It is to be understood in this respect that the foregoing is intended to be illustrative only and not be construed as a limitation on the information or message conveyed by sign 10. For example, the image 16 could be the international symbol for a woman.

In like manner, the representative image presented by raised area 22 depicting the international symbol for a disabled person is desirably of the same pigmentation as image 16 and therefore contrasting with backing member 12. Here again, it is to be understood that the image 18 may project any desired message for visual observation by sighted individuals, or may even be omitted if desired. The depiction is limited only by human imagination and skill in shaping the female cavity in the master metal mold.

In the illustrative sign 10 of FIG. 1, a raised divider area 24 is provided between images 16 and 18. It is to be understood in this respect that divider area 24 is not a requisite of the sign but simply a matter of choice by the sign maker. In like manner, a raised border 25 may be provided in surrounding relationship to the raised images of sign 10. Divider area 24 and borders 25 are also in most instances the same color as images 16 and 18.

The image 14 made up of raised areas 26 in the illustrative example of FIG. 1 defines lettering which is correlated with the international symbol 16 for a man. In this instance, raised areas 26 make up the word "MEN". The raised areas 26 are also desirably of the same color as raised areas 20 and 22, and contrast with the backing member 12.

Immediately below the letters defined by raised areas 26 are a series of raised dots 28 which cooperate to present characters 29 in the Braille alphabet and/or number series, in order that a visually impaired person may decipher the message conveyed by sign 10 through touch sensing of the Braille characters. It is desirable in this respect that the raised dots 28 be the same color as areas 20 and 22.

Although in the preferred embodiment of the invention, areas 20, 22, 24, 26 and dots 28 are all the same color, it is to be understood in this respect that the colors may be different if desired. However, the images will be more visually observable if of a color contrasting with the background of backing member 12. Furthermore, the raised dots may be of the same color as background 12 because they are intended to be deciphered by a visually impaired person. The background color of backing member 12 is preferably blue because that color has become universally associated with handicap signage. However, any background color that provides at least a 70% contrast is suitable. Colors that have been recommended for signs of this character include burgundy, black, deep green, brown and grey.

Braille characters must meet rigid requirements to be in compliance with Federal Regulations. The dots must be raised 1/32 in. from the surface of the background. In addition, the inter-dot spacing should be 0.090 in., the diameter of each dot should 0.059 in., the horizontal separation between cells should be 0.241 in. and vertical separation between cells should be 0.395 in.

The rigid tolerances and specifications imposed on Braille characters forming a part of handicap signage, presents significant cost of manufacture problems. In view of the large number of existing signs that require conversion, replacement or establishment for the first time, there is a real need to provide inexpensive signage that meets all mandated regulations. In meeting these goals, it has now been found that a preferred process includes a number of steps that should be carried out in a specific sequence. That sequence is depicted schematically in FIGS. 5-9 of the drawings.

First, a metal plate 30 is provided for preparation of a female mold. Plate 30 is preferably of copper, but may also be constructed of other metals including brass, steel, aluminum, magnesium or zinc. Metal is preferred for mold 30 because it is resistant to heat and pressure applied to the mold during manufacture of sign 10. Alternatively though, a master mold of metal may be used to prepare a number of duplicates of Bakalite or the like, so long as the material will withstand pressures applied thereto in the order of 1000 psi and temperatures of at least 500° F.

The required cavities in plate 30 are preferably formed by a combination of chemical etching and use of a cutting tool such as a pantograph controlling cutter or a hand-grinding machine 32, each of which has a rotatable bit 34. A photographic negative having opaque areas conforming to the visually observable depictions to be provided on the final sign is placed over plate 30 which is coated with a photoresist material. After exposure of the coated plate to light with the image defining negative thereover, the unreacted resist is washed away leaving bare metal areas of plate 30 exposed for chemical etching. Sufficient acid etch is applied to the copper plate to etch out cavities or grooves 38 which define the images 14, 16, 18 and 24 in the face of the copper plate.

Adequate control should be maintained over the acid etch process, to assure that faces 38c of groove 38 are substantially flat, properly finished and generally parallel to surface 36 of plate 30. Etching of the metal generally results in inclined walls 38a and 38b of each groove 38. It is preferred though that the zone of merger of each wall surface 38a and 38b with face 38c be relatively abrupt as opposed to substantially radiused, in order to assure that the sign images ultimately formed therein have relatively sharp outer edge margins which can be more readily sensed by touch deciphering of the sign image.

An exemplary hand-engraving tool in this respect is one used by engravers and that is pneumatically driven in a manner to cause bit 32 to be rotated at a rate of from about 10 rpm's to about 85,000 rpm's. Suitable engraving tools in this respect are available from Aro Corporation.

Viewing FIG. 5, it is to be understood that the etching process is carried out in a manner to etch away the surface 36 of plate 30 to provide a series of grooves 38 which define the images 14, 16, 18 and 24. Each of the etched grooves 38 has a pair of opposed, relatively inclined side walls 38a and 38b which merge with a flat face 38c which is co-planar with surface 36 of plate 30. Each groove 38 is preferably of a depth of about 1/32 in. That depth constitutes the height of raised areas 20, 22, 24 and 26 of sign 10.

Alternatively, a pantograph may conveniently be used by the engraver to guide a cutting tool to remove sufficient material from the copper plate to form the image-defining grooves in the upper surface of plate 30 which conform closely with the pre-established image pattern.

The indentations 40 however, cannot normally be prepared by etching procedures because of the face that etching processes are generally incapable of forming precisely shaped cavities of required shape for Braille dots. Etching processes result in conical indentations which are pointed at the innermost extremity of the cavity. Hand-engraving or use of a pantograph controlled cutting tool is therefore preferred for preparation of indentations 40 in mold plate 30.

Grinding or cutting tool 32 is therefore employed to form indentations 40 in surface 36 of plate 30, representing the dot pattern of Braille characters 29 of sign 10. The use of an engraving or cutting tool of the type described above permits the engraver to very precisely form indentations 40 so that each has a semispherical lower portion 42 which corresponds to the required dome shape of each Braille dot 28. It is to be understood in this respect that the depiction of tool 32 in FIG. 5 is for illustrative purposes only and is not intended to necessarily indicate that the bit 34 is of precisely the same diameter as the required indentation 40. The bit 34 can be smaller than the indentation and used by the engraver to hollow out a cavity conforming to the required configuration of such indentation. The depth of each indentation 40 should be 1/32 in. in order to comply with specifications established for Braille dots. Use of tool 32 in the manner indicated also allows the engraver to closely control the spacing between indentations 40, and to assure proper orientation of such indentations, one with respect to another so that the characters 29 ultimately formed therefrom comply with the Regulations.

A synthetic resin composition is prepared which ultimately becomes the raised images of sign 10. To this end, the epoxy resin is preheated to about 200° F. to increase its flowability and decrease the viscosity so that it si approximately equal to room temperature molasses. Unical 815, and Shell EPON epoxy resins have been found to be a suitable epoxy formulations. Generically, these resins are the reaction product of epichlorohydrin and halogenated Bisphenol A.

Shell epoxy hardener sold under the trade designation "U" is a suitable curing agent for the epoxy resins. A coloring pigment is added to the hardener before mixing thereof with the epoxy base resin. Titanium dioxide, CAS No. 13463-67-7, is a preferred coloring pigment. However, other colored pigments may be substituted for the preferred titanium pigment. The mixture, in a preferred formulation contains about 0.5 gm of titanium dioxide for each 30 milliliters of hardener. The range of titanium dioxide pigment is preferably from about 0.4 gm to about 0.7 gm for each 30 milliliters of hardener. The amount of pigment added may be varied depending upon the shade and hue of the color, the intensity of the color desired, and the compatibility of the pigment with the resin phase. The titanium dioxide and hardener mixture are blended for a mixing time of about 5 minutes. One part by weight of the hardener containing the coloring pigment is added to each two parts by weight of the epoxy base resin.

Engraved mold 30 having grooves 38 and indentations 40 in the surface 36 thereof, is preheated to about 200° F. A thin coating of paste wax is then applied to surface 36, including the surface of grooves 38 and indentations 40. Paste wax supplied by S. C. Johnson and Company has been found to be suitable in this respect. The wax serves as a release agent to prevent adherence of the epoxy resin to the surface of the mold during preparation of sign 10.

A sufficient quantity of the flowable tinted epoxy resin mixed with the hardener therefore, is poured over the engraved surface 36 of mold plate 30 to provide a layer 44 of the resin overlaying the plate as shown schematically in FIG. 6. The amount of resin poured over the surface 36 of plate 30 should be at least adequate to fill the grooves 38 and indentations 40. In practice though, it is preferred that an excess of the resin composition be deposited over surface 36 of plate 30 to assure that all of the grooves and indentations are completely filled with the epoxy material and to compensate for shrinkage of the resin during final curing thereof. The resin composition upon curing forms the images 14, 16, 18, 24 and characters 29 of sign 10.

Next, the backing member 12 is placed over layer 44 in covering relationship thereto as shown in FIG. 7. Backing member 44 is preferably a sheet of B-stage epoxy resin reinforced with E-glass cloth. The epoxy resin is 60% by weight of the sheet and the fibrous glass is the remaining 40%. The B-stage sheet is not completely cured, and therefore undergoes final curing during application of heat and pressure in subsequent steps of the process.

Alternatively, a backing member 12 of epoxy resin reinforced with glass fiber material which is fully cured may be used in lieu of a B-stage epoxy sheet. Here again, a fully cured epoxy resin board for use as backing member 12 may ordered from suppliers pre-colored. That product contains a coloring pigment in the resin, which if desired be a requisite blue color.

Glass fiber reinforced epoxy sheet material useful as backing member 44 preferably is about 0.060 in. thick. However, thicknesses of 0.030, or 0.015 in. may be used depending upon the sign 10 to be prepared.

The pot life of the epoxy composition making up layer 44 is usually at least about 5 minutes. Accordingly, within that time limitation, a flexible, relatively compressible pressure-compensating sheet element 46 is laid over the top of backing member 12 in covering relationship thereto (FIG. 8). Pressure-compensating element 46 is preferably a sheet of fibrous pulp material making up a relatively thin board member. A preferred pressure-compensating element is Alpine 203 "yellow board" supplied by Tschudi and Cie AG, Palnpappen, Switzerland. The compressible board is made up of about 37% long fiber bleached sulfate pulp, 28% special bleached sulfite pulp, 14% hardwood bleached sulfite pulp, 15% fiber, and 5% additives. The thickness of the board is from about 0.30 to about 0.035; it has a density of from about 0.75 to about 0.85 gm/cm$^3$, a water content of from about 6–10%, an ash content of 12–15%, a pH of 6.5–8, a bursting strength of 3.5–5 kg/cm$^2$, a water absorption of 30–40% within 5 seconds, and a shore A2 durometer value of from about 75–90 and preferably about 88.

As an alternate for the "yellow board," a sheet of polyurethane may be used having a Shore D durometer value of from about 75 to 90 (preferably about 90), and a thickness ranging from about 0.060 in. to about 0.180 in. For most applications, a polyurethane mat thickness of about 0.060 is suitable.

The sandwich of components 47 as illustrated in FIG. 8 and made up of plate 30, layer 44, backing member 12 and the fibrous compressible mat or element 46 is placed in a press broadly designated 48 in FIG. 9, which for example may include a fixed bed 50 and a movable platen 52 secured to a hydraulic ram 54. The ram should be capable of exerting a pressure of at least 1000 psi on the sandwich of components 47 interposed between bed 50 and platen 52. For example, if the sign 10 to be produced has an overall size of about 8 × 8 inches, the press 48 should be operated to exert a pressure of at least about 30 tons, and preferably 35 tons on the components making up sandwich 47. In addition, the bed 50 and platen 52 should be of the type that can be heated so that the temperature of plate 30 can be raised to a level of at least about 285° F. to accelerate curing of layer 44, and final curing of backing member 12 if a B-stage resin is used. The total time of the sandwich 47 is press 48 should be sufficient to effect curing of the epoxy resin, but 20–90 seconds under a pressure of at least about 1000 psi has been found adequate with 60 seconds being preferred in this respect.

During application of heat and pressure to sandwich 47, the epoxy resin composition making up layer 44 is expressed from the space between backing member 12 and the surface 36 of mold plate 30, except for the resin material that remains in grooves 38 and indentations 40.

Upon removal of sandwich 47 from press 48, the compressible element 46 may be peeled away from backing member 12, and the sign 10 presented by member 12 and the epoxy resin composition adhering thereto pulled away from master mold 30. The paste wax applied to the surface 36 of mold 30 facilitates removal of the sign 10 from mold 30.

By virtue of the fact that the resin composition making up layer 44 is expressed from the space between backing member 12 and surface 36 of mold plate 30 during the residence time of sandwich 47 is press 48, the only portion of layer 44 remaining when the sign 10 is pulled away from mold plate 30, are the portions of such layer resided in grooves 38 and indentations 40 at the conclusion of the pressure and heat application step illustrated schematically in FIG. 9 of the drawings. As a consequence, the backing member 12 acts as a background for the lighter colored images 14, 16 and 18, the line 24 and boarder 25 if provided, and the Braille character-defining dots 28. Pressure-compensating element or mat 46 has been found necessary to prevent the epoxy resin composition making up layer 44 from spreading over the surface backing member 12 in the form of stray lines or insulated bubbles, which would adversely effect the appearance of the sign 10.

In addition, sand blasting of the grooved surface of master mold 30 to form a matte finish in surface 36 as well as throughout the extent of grooves 38 including margins 38a and 38b and faces 38c reduces the likelihood that pigmented resin will not be fully expressed from the ungrooved face of the mold which would find otherwise to impart a hazy appearance to the signage produced therefrom.

The flexible, compressive nature of mat 46 assures expression of the resin composition 44 from all parts of the adjacent face of backing member 12 during application of heat and pressure to sandwich 47, even though there may be some surface irregularities in the face of backing member 12 directly exposed to the resin composition layer 44.

The edges of sign 10 may then be trimmed as desired and the final product is ready for use without any further processing thereof being required.

Preparation of sign 10 from a glass reinforced epoxy resin imparts enhanced durability to the signage whether used indoors or outdoors. The materials employed to fabricate sign 10 have excellent weathering properties under varying ambient condition seven when exposed to sunlight for extended periods; Furthermore, the composition is able to withstand widely divergent temperature and moisture conditions.

We claim:

1. A process for producing signage having a message-defining image that can be read by sighted individuals and a series of dots presenting a corresponding encoded message in Braille characters that can be touch deciphered by visually impaired persons, said process including the steps of:

providing a master female mold having a surface including grooves therein presenting said visually observable message and a series of indentations defining a corresponding message in said Braille characters;

depositing a layer of a flowable synthetic resin composition on said surface of the master female mold in filling relationship to said grooves and indentations, said composition possessing the property of becoming a solid mass upon application of elevated heat and pressure relative to ambient conditions;

placing a backing member over said surface of the master mold in covering relationship to said flowable layer of the synthetic resin composition, said backing member being formed of an at least partially cured epoxy resin composite;

laying a pressure-compensating element over the backing member, the pressure compensating element being flexible and compressible relative to the backing member;

applying sufficient pressure and supplying adequate heat to the mold with the backing member and element thereon for a time period to effect conversion of the composition into a solid while at the same time expressing the composition from the space between the mold and said backing member except for the material in said grooves and indentations;

causing said quantity of material in said grooves and indentations to adhere to the adjacent portions of the backing member; and thereafter removing the backing member with the message-defining solid composition firmly adhering thereto from between the mold and said element.

2. A process for producing signage for sighted and visually impaired persons as set forth in claim 1, wherein said step of laying a pressure-compensating element over the mold includes laying a compressible sheet of fibrous pulp material over the mold.

3. A process for producing signage for sighted and visually impaired persons as set forth in claim 1, wherein said step of laying a pressure-compensating element over the backing member includes laying an element over the mold which has a Shore A2 duromter value of from about 75 to 90.

4. A process for producing signage for sighted and visually impaired persons as set forth in claim 3, wherein said step of laying a pressure-compensating element over the backing member includes laying a fibrous pulp element over the mold which has a thickness of from about 0.030 to about 0.035 inch and a Shore A2 durometer value of about 88.

5. A process for producing signage for sighted and visually impaired persons as set forth in claim 1, wherein is included the step of forming indentations in the surface of the master mold which are generally dome shaped.

6. A process for producing signage for sighted and visually impaired persons as set forth in claim 1, wherein is included the step of forming grooves in said surface of the master mold defined by spaced, opposed side margins and an essentially flat face remote from the surface of the mold, said faces being generally in coplanar relationship throughout the extent of the mold.

7. A process for producing signage for sighted and visually impaired persons as set forth in claim 6, wherein is included the step of treating the surface of the master mold and said margins and faces thereof to define an essentially matte finish thereon.

8. A process for producing signage for sighted and visually impaired persons as set forth in claim 1, wherein is included the step of incorporating a pigment in the synthetic resin composition of a distinctive color different than the color of the backing member to form at least a 70% contrast.

9. A process for producing signage for sighted and visually impaired persons as set forth in claim 8, wherein said synthetic resin composition is an epoxy resin and the pigment is titanium dioxide, and said step of incorporating the pigment in the composition includes admixing the pigment with a hardening agent for the epoxy, and then combining the pigment and hardener admixture with the epoxy resin immediately prior to pouring of the resin composition over said surface of the mold.

10. A process for producing signage for sighted and visually impaired persons as set forth in claim 1, wherein said composition is an epoxy resin and the backing board is an epoxy resin reinforced with glass fibers, said step of applying heat and pressure to the mold with the backing member an element thereon including the steps of supplying sufficient heat and pressure to the combination of the mold, backing member and element to effect full polymerization of the resin composition while in contact with the backing member to assure firm bonding of the composition defining said messages to the backing member.

11. A process for producing signage for sighted and visually impaired persons as set forth in claim 1, wherein said step of applying heat and pressure to the mold with the backing member and element thereon includes the step of applying a total pressure thereto of at least about 1000 psi.

12. A process for producing signage for sighted and visually impaired persons as set forth in claim 1, wherein said step of applying heat and pressure to the mold with the backing member and element thereon includes the step of supplying sufficient heat thereto to raise the temperature of the composition to a level of at least about 285° F.

13. A process for producing signage for sighted and visually impaired persons as set forth in claim 1, wherein said master mold is a metal plate and the step of forming said dome shaped indentations in the surface thereof includes the step of removing sufficient metal from the mold to define said indentations, using a cutting tool.

14. A process for producing signage for sighted and visually impaired persons as set forth in claim 1, wherein said backing member is fabricated of a partially cured, B-stage epoxy resin reinforced with glass fibers, and the composition as an uncured epoxy resin, and wherein said step of applying heat and pressure to the mold with the backing member and element thereon includes applying sufficient heat and pressure to effect final curing of the resin making up the backing board, while at the same time effecting final curing of the synthetic resin composition.

15. A process for producing signage for sighted and visually impaired persons as set forth in claim 1, wherein said element is a sheet of polyurethane material having a thickness of from about 0.060 to about 0.180 inch and a Shore D durometer value of about 75-90.

* * * * *